May 11, 1937.　　　　C. S. POWELL　　　　2,080,336
PEANUT HARVESTER AND CULTIVATOR
Filed Aug. 15, 1936　　　5 Sheets-Sheet 1
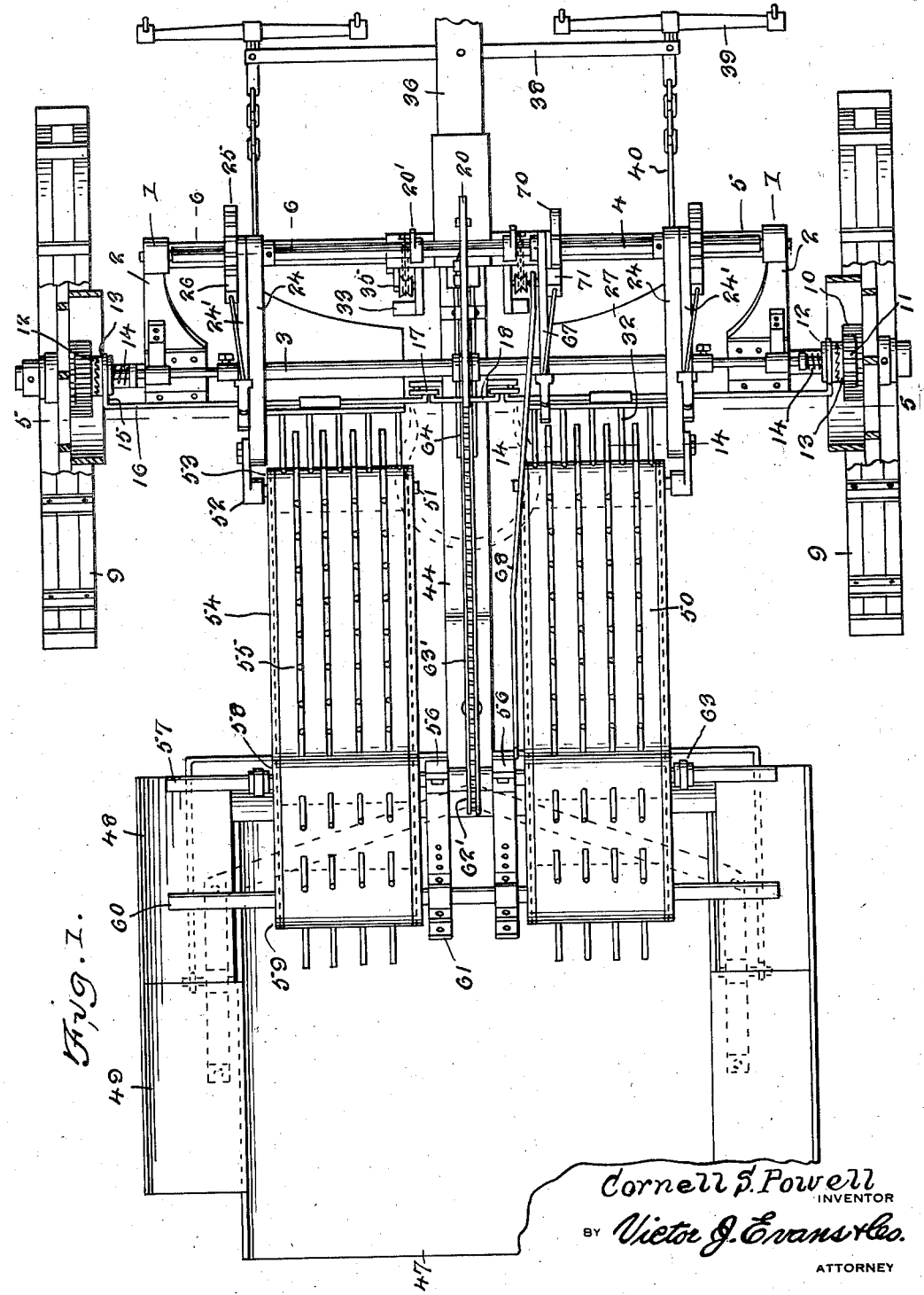

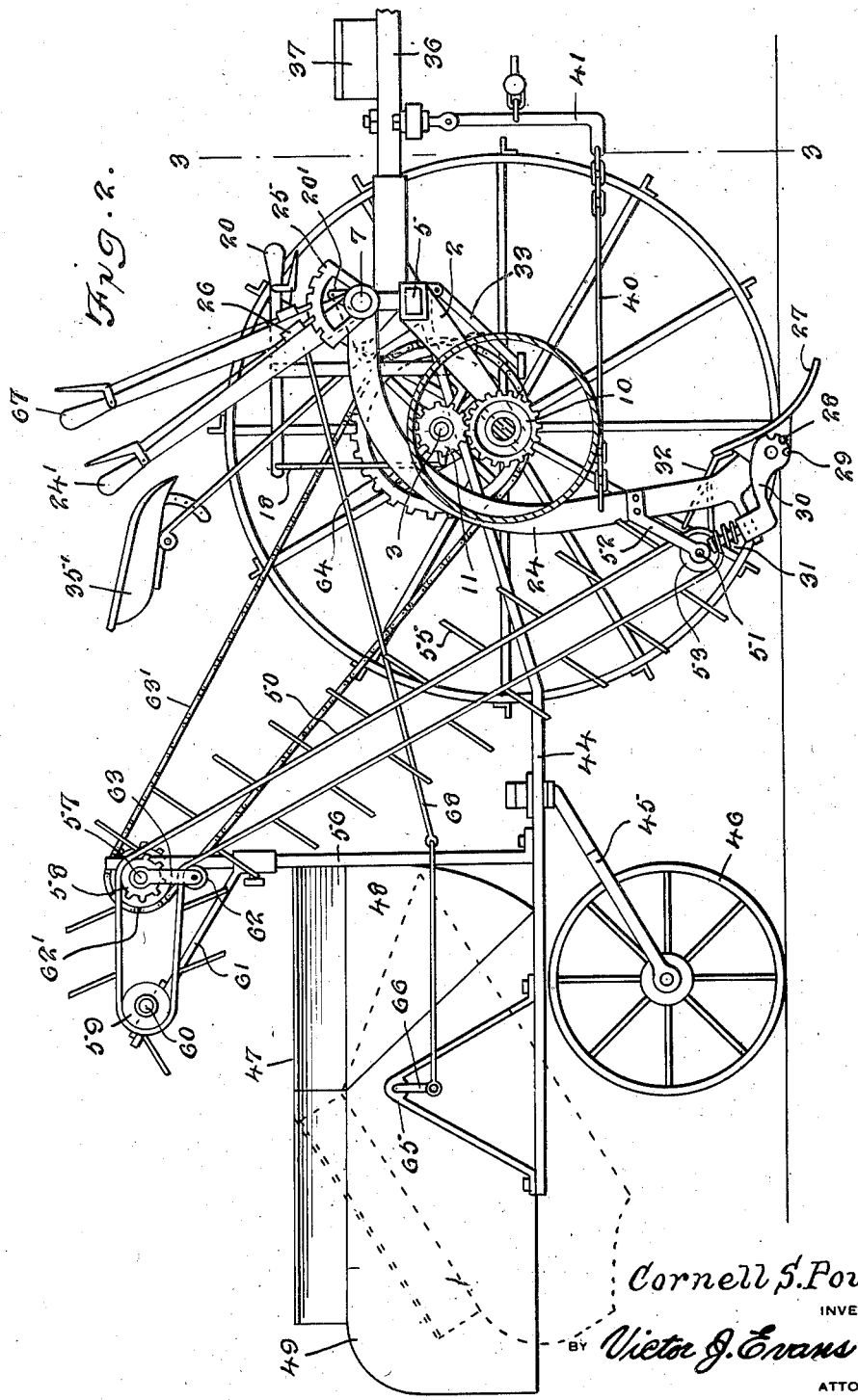

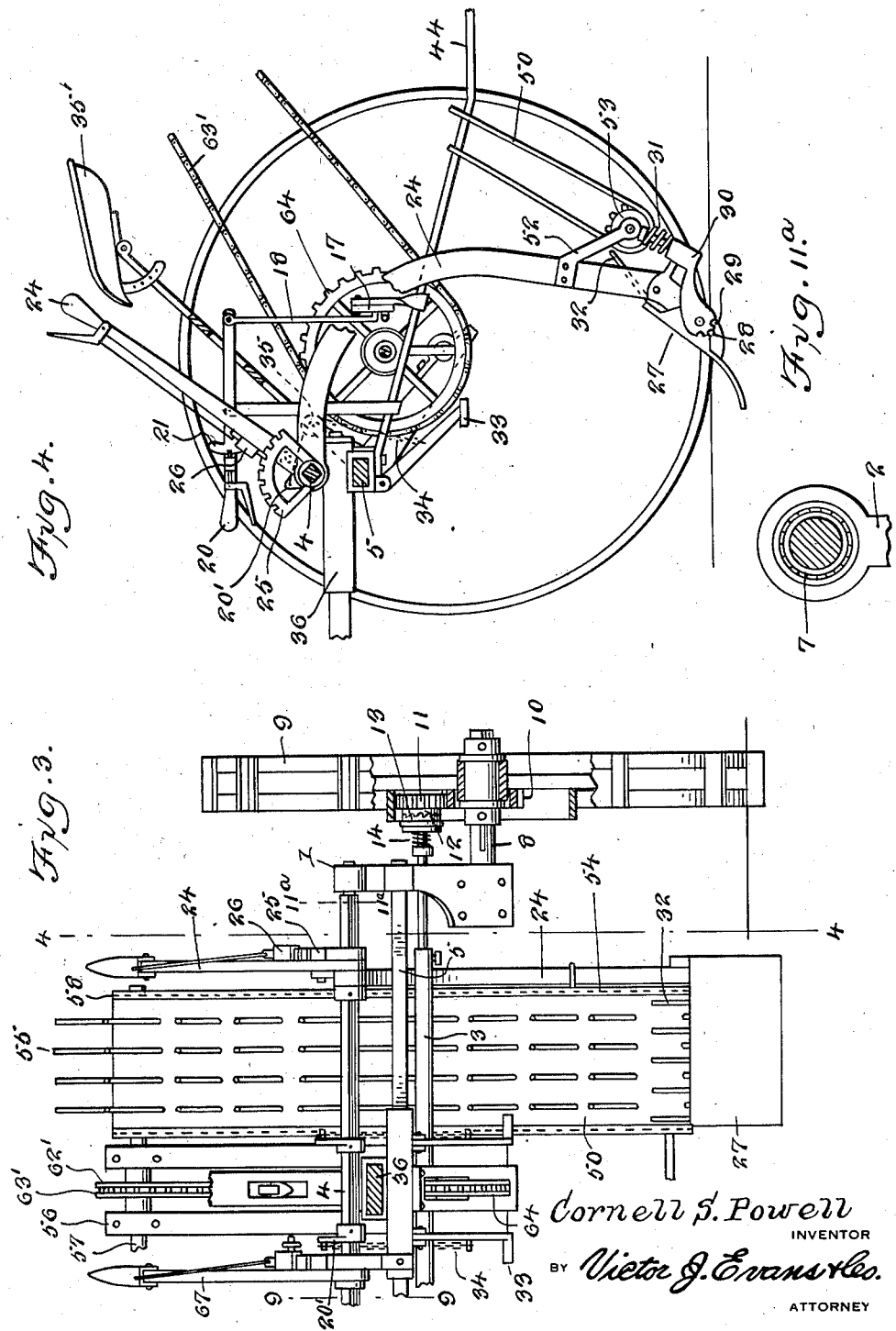

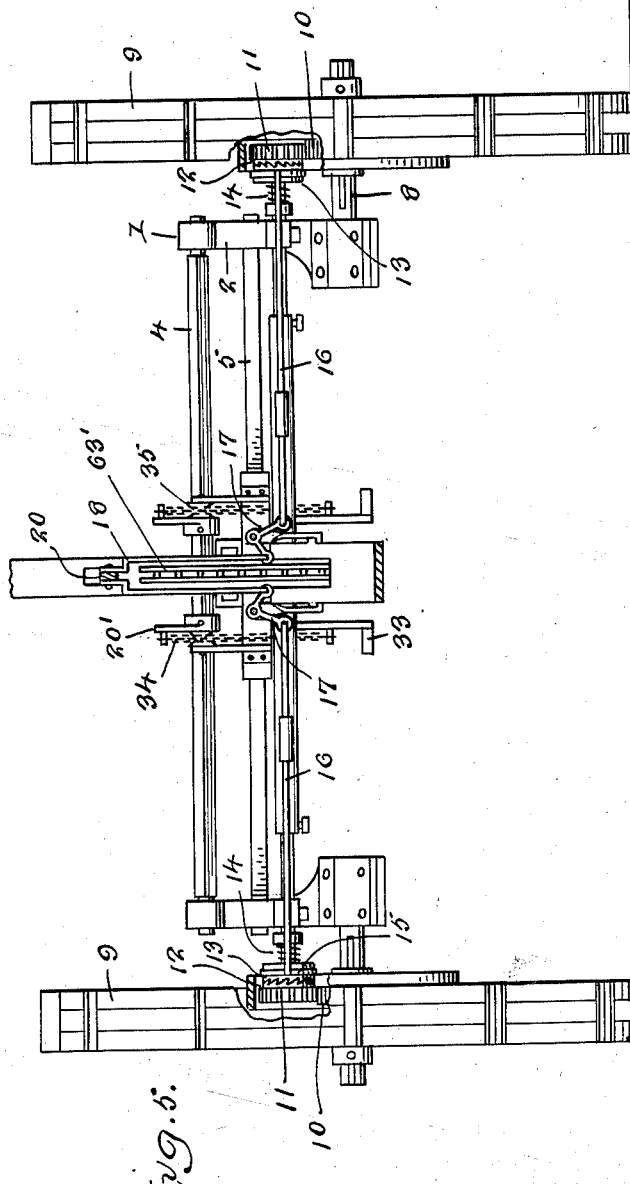

May 11, 1937.  C. S. POWELL  2,080,336
PEANUT HARVESTER AND CULTIVATOR
Filed Aug. 15, 1936  5 Sheets-Sheet 5
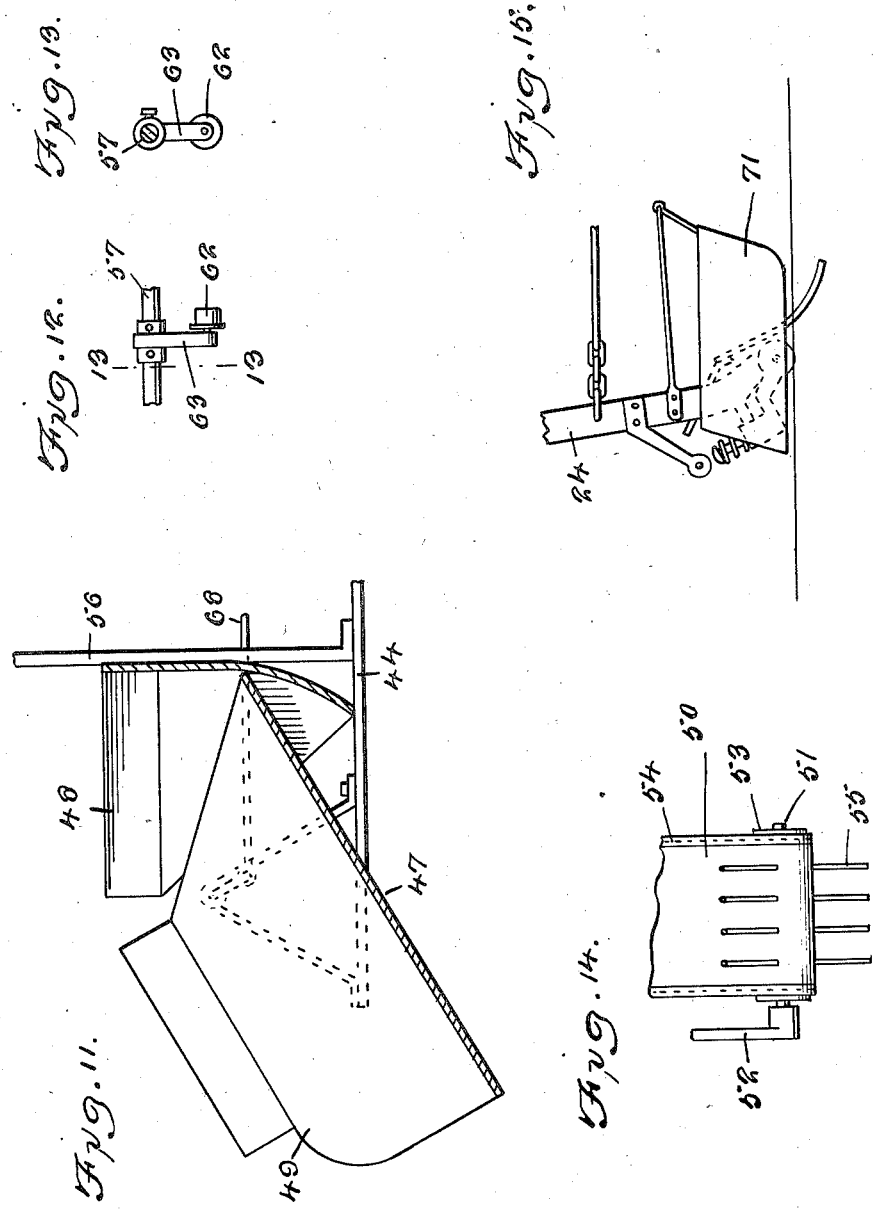
Cornell S. Powell
INVENTOR
BY Victor J. Evans & Co.
ATTORNEY Patented May 11, 1937

2,080,336

UNITED STATES PATENT OFFICE 2,080,336

PEANUT HARVESTER AND CULTIVATOR

Cornell S. Powell, Savannah, Ga.

Application August 15, 1936, Serial No. 96,272

5 Claims. (Cl. 55—134)

This invention relates to peanut harvesters, and has for the primary object the provision of a device of this character which will efficiently and rapidly dig peanuts from the soil and convey the peanuts and their vines to a carrier, the latter being so constructed that the peanuts and vines may be easily dumped into stacks or piles to render gathering thereof comparatively easy.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view, partly in section, illustrating a peanut harvester constructed in accordance with my invention.

Figure 2 is a side elevation, partly in section, illustrating the same.

Figure 3 is a sectional view taken on the line 3—3 of Figure 2.

Figure 4 is a sectional view taken on the line 4—4 of Figure 3.

Figure 5 is a sectional view taken on the line 5—5 of Figure 1.

Figure 6 is a detail sectional view taken on the line 6—6 of Figure 1.

Figure 7 is a sectional view taken on the line 7—7 of Figure 6.

Figure 8 is a sectional view taken on the line 8—8 of Figure 6.

Figure 9 is a sectional view taken on the line 9—9 of Figure 3.

Figure 10 is a sectional view taken on the line 10—10 of Figure 9.

Figure 11 is a fragmentary sectional view illustrating a dump mechanism of the carrier of the harvester.

Figure 11a is a detail sectional view taken on the line 11a—11a of Figure 3.

Figure 12 is a detail view showing one of the guide rollers for supporting the conveyors.

Figure 13 is a sectional view taken on the line 13—13 of Figure 12.

Figure 14 is a fragmentary sectional view taken on the line 14—14 of Figure 1.

Figure 15 is a fragmentary side elevation illustrating one of the plow beams and its plow shoe and guard for the latter carried by the plow beam.

Referring in detail to the drawings, the numeral 1 indicates a frame of the straddle row type including end members 2, rotatably supporting a power axle 3 and also rotatably supporting a shaft 4 having squared faces. The end members 2 are connected by a bar 5. The shaft 4 is journaled to the end members 2 by anti-friction bearings, as shown at 7, and said end members have secured thereto horizontal stub axles 8 on which are journalled bull wheels 9. The power axle 3 is of the sectional type so that its length may be varied. The bull wheels each have secured thereto gears 10 which mesh with pinions 11 journaled on the power axle 3 and includes clutch elements 12 to cooperate with clutch elements 13 splined to the power axle 3. Springs 14 act on the clutch elements 13 to urge them in engagement with the clutch elements 12 to establish drives between the bull wheels and the power axle and the clutch elements each are of the ratchet tooth type to permit either bull wheel to turn slower than the other to compensate for the movement of this device on turns. Calks 15 engage with the clutch elements 13 and are formed on connecting links 16 each adjustable as to length. The connecting links are pivoted to bell crank levers 17 and the latter are pivotally mounted on the bar 5. Links 18 connect the bell crank levers to a control lever 20 pivotally mounted and operating in connection with a fixed segmental rack 21 whereby the clutches may be disengaged and held in the latter-named position. The control lever 20 has the usual manual control dog to engage with the segmental rack 21. The springs 14 act to engage the clutch element so that when the control lever 20 is properly positioned, the drives between the bull wheels and the power axle 3 will be established.

Journal sleeves 22 are fixed against rotation on the bar 4 and are adjustable endwise of said bar and held in adjusted positions by set bolts 23. The journal sleeves 22 have journaled thereon plow beams 24 of the goose neck type and secured to the journaled ends of said plow beams are control levers 24' and formed on the journal sleeves are segmental racks 25 engaged by dogs 26 of the control levers 24' whereby through the manipulation of the control levers the plow beams may be raised and lowered. Plow shares 27 are pivotally mounted to the ground ends of the plow beams for action on the soil. The angle of the plow shares may be varied and held in adjusted position by pins 28 fitting in notches 29 of brackets 30. The brackets 30 are cushioningly mounted, as shown at 31, to permit the plow shares to kick back when contacting an obstruction. The plow shares act on the soil to remove therefrom peanuts which are caught by spaced fingers 32 extending rearwardly and upwardly with respect to the plow shares. These fingers are carried by a head adjustable as to length and which head is supported by the plow beams.

Foot pedals 33 are pivoted to the bar 5 and are connected to the pivoted ends of control levers 20' by flexible elements 34, the latter being trained over suitable pulleys 35 to permit the operator to raise or lower the plow beams by employing both the hands and feet. The operator is supported by a seat 35' carried by the frame 1 and located adjacent the control levers 20 and foot pedals 33. Extending forwardly from the frame 1 is a draft tongue 36 supporting a tool box 37. A double tree 38 is pivoted to the draft tongue and is equipped with single trees 39 to which draft animals may be hitched. The ends of the double tree 38 are connected to the plow beams by flexible elements 40 so that the draft power may be delivered directly onto the plow beams. The connection between the single trees and the double tree is by depending arms 41 pivoted to the single tree and having the double tree pivoted thereto and their lower ends connected to the flexible elements 40.

A carrier frame 44 is connected to the frame 1 and extends rearwardly therefrom and has pivotally connected thereto forked axles 45 to which ground wheels 46 are journaled. The forked axles 45 are free to turn in either direction so that the ground wheels 46 readily follow the bull wheels.

Supported by the carrier frame 44 is a dump body 47 consisting of a fixed section 48 and a pivotally mounted section 49 capable of being swung downwardly with respect to the fixed section 48 for dumping the contents of the body. When the movable section 49 is moved into dumping position, a portion thereof moves upwardly in the fixed section 48 so that the entire contents of the body will slide therefrom onto the ground in a pile or stack. The sides of the body are flared so that peanuts and their vines may be easily directed into the body.

Endless conveyors 50 operate between plow shares and the body for elevating the peanuts and vines from the fingers of the plow shares upwardly and rearwardly into the body. Each plow share has a conveyor 50 associated therewith. Each conveyor includes an upwardly and rearwardly extending portion and a horizontal portion disposed over the body. A shaft 51 adjustable to length is supported to the plow beams by brackets 52 and has journaled thereon drums 53 including sprocket wheels to mesh with sprocket chains 54 forming part of the endless conveyors, the latter having rows of fingers 55. These fingers are adapted to pass between the fingers of the plow share to catch in and remove therefrom the peanuts and vines and lift them upwardly and rearwardly and deposit them into the body 47.

A supporting structure 56 is carried by the carrier frame 44 in advance of the body 47 and has journaled thereto a shaft 57 adjustable as to length and on which are journaled drums 58 including sprocket wheels to mesh with the sprocket chains 54. The conveyors pass over the drums 58 and over drums 59 supported by a shaft 60 paralleling the shaft 57 and rearwardly thereof and disposed over the body 47. The drums on the shafts 57 and 60 are adjustable endwise of said shaft and the shaft 60 is supported by a bracket 61 carried by the supporting structure 56. The upper runs of the conveyors pass over the drums 57, while the lower runs pass over guide pulleys 62 journaled to arms 63 adjustable endwise of the shaft 57. The drums 58 are fixed for rotation with the shaft 57 and the shaft 57 has secured thereto a sprocket gear 62' engaged by a sprocket chain 63' and the latter is trained over a sprocket gear 64 secured to the power shaft 3. Thus it will be seen that the conveyors are driven by the bull wheels to convey the plowed peanuts and vines to the body of the carrier.

The movable section 49 is pivotally mounted, as shown at 65, and has connected thereto a crank arm 66 which is connected to a control lever 67 by linkage 68. The control lever 67 is journaled on a sleeve 69 adjustable endwise of the bar 4 and mounted on the sleeve 69 and connected to the bar 5 is a segmental rack 70 operating in conjunction with a dog 71 of the control lever whereby said control lever may be secured in position either to retain the movable section 49 of the body 47 in dumping or load carrying position.

Operating in conjunction with the plow shares are guards 71 supported to the plow beams.

A device of the character described and shown in the drawings is capable of easy adjustment so that it will operate simultaneously upon rows of growing peanuts and may be made to adapt itself to rows that vary in distances apart. The plow shares dig the peanuts from the ground, which with the vines pass onto the fingers adjacent the plow shares and are taken up by the fingers of the conveyors and elevated and deposited into the body of the carrier. After accumulation of peanuts and vines in the body the latter may be dumped so as to deposit the peanuts and vines in piles or stacks. Also, it will be noted that the depth of plowing by the plow shares can be easily regulated by the operator of the device.

Having described the invention, I claim:

1. A peanut harvester comprising a frame, bull wheels supporting said frame, means for connecting draft means to said frame, digging means carried by said frame and adjustable towards and from the ground, means for adjusting said digging means, a wheel carrier connected to said frame and trailing the latter, conveying means receiving plowed growth from the digging means and conveying the same to the carrier, and means for driving the conveyors by the bull wheels.

2. A peanut harvester comprising a frame adjustable to adapt the device to rows of growth varying in distances apart, bull wheels supporting said frame, means connecting draft means to the frame, plow beams adjustable endwise of said frame and movable upwardly and downwardly with respect to the ground, plow shares carried by said plow beams for digging growth and soil, means for raising and lowering the plow beams, a carrier connected to and trailing the frame, conveyors driven by said bull wheels for conveying the plowed growth from the plow shares to the carrier, and drive means for connecting and disconnecting the conveyors to the bull wheels.

3. A peanut harvester comprising an adjustable frame, draft attaching means connected to said frame, bull wheels supporting said frame, digging means adjustable on said frame and adjustable towards and from the ground, means for raising and lowering said digging means, a wheel carrier connected to the frame and trailing the latter, a body mounted on said carrier and including fixed and movable sections whereby the contents of said body may be emptied, and conveying means operating between the digging means and the body.

4. A peanut harvester comprising an adjustable frame, draft attaching means connected to said frame, bull wheels supporting said frame, digging means adjustable on said frame and adjustable towards and from the ground, means for raising and lowering said digging means, a wheel carrier connected to the frame and trailing the latter, a body mounted on said carrier and including fixed and movable sections whereby the contents of said body may be emptied, conveying means operating between the digging means and the body, said conveying means including an upwardly and rearwardly inclined portion and a horizontally arranged portion disposed over the body.

5. A peanut harvester comprising an adjustable frame, draft attaching means connected to said frame, bull wheels supporting said frame, digging means adjustable on said frame and adjustable towards and from the ground, means for raising and lowering said digging means, a wheel carrier connected to the frame and trailing the latter, a body mounted on said carrier and including fixed and movable sections whereby the contents of said body may be emptied, conveying means operating between the digging means and the body, said conveying means including an upwardly and rearwardly inclined portion and a horizontally arranged portion disposed over the body, and a manual means for moving the movable section into dumping and load carrying position.

CORNELL S. POWELL.